US006587779B1

(12) United States Patent
Kerner et al.

(10) Patent No.: US 6,587,779 B1
(45) Date of Patent: Jul. 1, 2003

(54) TRAFFIC SURVEILLANCE METHOD AND VEHICLE FLOW CONTROL IN A ROAD NETWORK

(75) Inventors: Boris Kerner, Stuttgart (DE); Hubert Rehborn, Fellbach (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/762,516

(22) PCT Filed: Aug. 6, 1999

(86) PCT No.: PCT/EP99/05689

§ 371 (c)(1), (2), (4) Date: Apr. 16, 2001

(87) PCT Pub. No.: WO00/08615

PCT Pub. Date: Feb. 17, 2000

(30) Foreign Application Priority Data

Aug. 8, 1998 (DE) ........................................ 198 35 979

(51) Int. Cl.[7] ............................ G06G 7/76; G06F 19/00

(52) U.S. Cl. ....................... 701/117; 701/118; 701/119; 340/909; 340/920; 340/934; 348/148; 348/149; 382/104

(58) Field of Search ................................ 701/117, 118, 701/119; 340/901, 905, 907, 908, 911, 914, 917, 920, 922, 931, 932, 933, 934, 936, 916; 382/104; 348/149, 113, 118, 148, 143

(56) References Cited

U.S. PATENT DOCUMENTS

| | | | | | |
|---|---|---|---|---|---|
| 5,281,964 | A | * | 1/1994 | Iida et al. | 340/933 |
| 5,444,442 | A | * | 8/1995 | Sadakata et al. | 340/916 |
| 5,684,475 | A | * | 11/1997 | Krause et al. | 340/933 |
| 5,696,502 | A | * | 12/1997 | Busch et al. | 340/905 |
| 5,822,712 | A | * | 10/1998 | Olsson | 340/934 |
| 5,861,820 | A | * | 1/1999 | Kerner et al. | 340/919 |
| 6,131,064 | A | * | 10/2000 | Vieweg | 340/905 |
| 6,240,364 | B1 | * | 5/2001 | Kerner et al. | 340/988 |
| 6,246,955 | B1 | * | 6/2001 | Nishikawa et al. | 701/117 |

FOREIGN PATENT DOCUMENTS

| | | | | | |
|---|---|---|---|---|---|
| DE | 4241408 | A1 | * | 6/1994 | G08G/1/00 |
| WO | WO 9218962 | A1 | * | 10/1992 | G08G/1/01 |

* cited by examiner

*Primary Examiner*—Jacques H. Louis-Jacques
(74) *Attorney, Agent, or Firm*—Crowell & Moring LLP

(57) ABSTRACT

In a method for monitoring and controlling traffic states in a road traffic system current or predicted traffic states are determined for one or more points and a distinction is made between the three types of traffic states: free-flowing traffic, slow-moving traffic and stationary traffic. Vehicle inflow into the traffic system is then controlled as a function of the detected traffic states. The state monitoring method is configured to detect phase transitions between free-flowing and slow-moving traffic and/or stationary traffic states, which can be detected or predicted by means of specified criteria. Furthermore, according to the invention the vehicle inflow into the monitored traffic system section is controlled as a function of detected phase transitions between free-flowing and slow-moving traffic.

20 Claims, 1 Drawing Sheet

TRAFFIC SURVEILLANCE METHOD AND VEHICLE FLOW CONTROL IN A ROAD NETWORK

BACKGROUND AND SUMMARY OF THE INVENTION

This application claims the priority of German priority document 198 35 979.9, filed Aug. 8, 1998 and PCT International Patent Application No. PCT/EP99/05689, filed Aug. 6, 1999, the disclosures of which is expressly incorporated by reference herein.

The invention relates to a method for monitoring traffic states in a road traffic system and to a method for controlling vehicle inflow as a function of the traffic states.

Various methods of this type are known in the field of traffic control technology. The traffic states are sensed at a given time for a particular monitoring point of the road traffic system, using measuring equipment with appropriate sensors. Alternatively, or in addition, the traffic states at the monitoring point are predicted in advance. An appropriately configured traffic control computer which is normally used for this purpose, suitably evaluates the measured data, and preferably also empirically determined predicted values for the traffic states to be expected at the particular monitoring point at a time in question. The traffic state information which is determined in this way can then be used for various purposes; for example for travel time prediction, for dynamic route planning and for traffic-controlling intervention such as controlling the vehicle inflow at entries into a respective section of the traffic system. The term "control" is used above, for the sake of simplicity, in its wider sense which includes both open-loop and closed-loop control systems.

Investigations have shown that the traffic states in road traffic systems can be divided into three significantly different types; specifically free traffic flow, synchronized traffic flow and wide moving traffic jams. See B. S. Kerner and H. Rehborn, Experimental features and characteristics of traffic jams, Phys. Rev. E, Vol. 53, page 1297, 1996 and B. S. Kerner and H. Rehborn, Experimental properties of complexity in traffic flow, Phys. Rev. E, Vol. 53, page R4275, 1996. Free traffic flow is understood here to be the state in which any road user can freely select its velocity and any desired overtaking maneuvers are possible. The wide moving traffic jams state signifies stationary vehicles with maximum traffic density on the road. Synchronized traffic flow, also referred to as stop-and-go traffic, constitutes a traffic state between free traffic flow and the wide moving traffic jams state, in which the traffic density (i.e., the traffic flow) may be relatively large but is significantly higher, and thus the velocity of the vehicles is significantly lower, than in free traffic flow, which very greatly increases the trip time. Owing to the higher traffic density, overtaking maneuvers are virtually impossible; for this reason the velocity of the vehicles at one location on the different lanes of a multilane road (expressway) is slow-moving when all the lanes are going in the same direction.

There are numerous known methods for detecting the wide moving traffic jams state by analyzing locally measured traffic data, including disruption detection and analysis. See, for example, German patent document DE 196 47 127 A1 and the literature referred to in it.

The control of the inflow of vehicles, also referred to as inflow metering, constitutes one of the possible ways of controlling the traffic flow when traffic disruption is detected or predicted, and thus preventing the occurrence of disruption or in any case as far as possible restricting its consequences in order to minimize increasing trip times and to maximize the efficiency of the roads. There are numerous known methods for inflow metering for entries to expressways. For example, a simple strategy frequently used in the USA has been to simply close off the entries when traffic comes to a standstill; but methods have also been used there in which the total of the inflow and upstream measurement in comparison with the downstream capacity of the road has been used as a criterion for restricting inflow, see L. E. Lipp, L. J. Corcoran, A. H. Hickman, Benefits of central computer control for Denver ramp-metering system, Transportation Res. Board No. 1320, Washington D.C., 1991 and N. L. Nihan, M. G. H. Bell, A predictive algorithm for real-time ramp control system, ITE Journal, June 1992.

In Great Britain a multilayered algorithm has been used for inflow control. In this algorithm the road capacities were monitored and an inflow control was carried out at excessively low velocities, the space/time profile of the waves of traffic density being tracked and the queue length of backed-up vehicles being used. See D. Owens, M. J. Schofield, Access control on the M6 motorway: evaluation of Britain's first ramp-metering scheme, Traffic Engineering+Control, page 616, 1988. In the Netherlands, on the other hand, a concept of individual metering for vehicle circulation times between 4.5 seconds and 12 seconds with the latter value as the maximum possible value was investigated. This concept corresponds to metering between 300 vehicles/h and 800 vehicles/h. See H. Bujin, F. Midelham, Ramp metering control in the Netherlands, Road Traffic Control May 1990 and Projektbericht DRIVE I Project V 1035 CHRISTIANE—Isolated Ramp Metering: Real Life Study in The Netherlands, Deliverable 7a, March 1991 of the EU project CHRISTIANE.

In France, CHRISTIANE was developed and used within the EU project and subsequently the ALINEA algorithm was developed and used in field trials in Germany (and in Germany in a modified form with the traffic density instead of the degree of occupancy). See the project report DRIVE I Project V 1035 CHRISTIANE—Isolated Ramp Metering: Real Life Study in France and Software Prototypes, Deliverable 7b, October 1991 and P. Stöveken, Verfahren zur Steuerung des Verkehrsablaufs auf Stadtautobahnen mittels Geschwindigkeits- und Zuflußregelung, Straßenverkehrstechnik June 1992.

Both the wide moving traffic jams state and the state of synchronized traffic flow are highly significant for maintaining the greatest possible efficiency of road use. The trip times in the case of synchronized traffic flow are significantly increased in comparison with free traffic flow, which is undesirable in itself, and in addition for associated applications, for example telematics applications. There is therefore a need for a method for detecting reliably the state of synchronized traffic flow and distinguishing in particular from the state of free traffic flow so that this information can then be suitably used for inflow metering which exploits the efficiency of the road in the best possible advantage and/or for short-term prediction of trip times.

One object of the invention is to provide a method for monitoring traffic states of the type described above.

Another object of the invention is to provide a vehicle inflow control method which uses such monitoring method and with which the traffic transitions can be reliably monitored, and when necessary estimated in advance, in particular with regard to phase transitions between free traffic flow and synchronized traffic flow and/or with regard to wide moving traffic jams states.

Finally still another object of the invention is to provide a method and apparatus which achieves a high degree of efficiency of a monitored section of the traffic system, with relatively little expenditure.

These and other objects and advantages are achieved by the method and apparatus according to the invention, in which current or predicted traffic states are determined for one or more points and a distinction is made between the three types of traffic states: free traffic flow, synchronized traffic flow and wide moving traffic jams. Vehicle inflow into the traffic system is then controlled as a function of the detected traffic states. The state monitoring method is configured to detect or predict phase transitions between free traffic flow and synchronized traffic flow and/or wide moving traffic jams states, by means of specified criteria. Furthermore, according to the invention the vehicle inflow into the monitored traffic system section is controlled as a function of detected phase transitions between free traffic flow and synchronized traffic flow.

The monitoring methods according to the invention permit comparatively reliable detection of the phase transitions from free traffic flow to synchronized traffic flow and vice versa from synchronized traffic flow to free traffic flow, using relatively simple means. The conditions utilized for this purpose both provide a reliable way of distinguishing between free traffic flow and synchronized traffic flow and can be tested using measuring and computational equipment with an acceptable degree of expenditure.

The measured parameters which are used for this, such as the average velocity, (i.e., the average velocity of vehicles passing the monitoring point on one or more lanes of the road), and the traffic flow, (i.e., the number of vehicles passing the monitoring point per time unit) can be sensed easily. Traffic flow is to be understood here and below in all cases as a traffic flow per lane; that is, either for each lane or averaged over all the lanes of one roadway. Accordingly, inflows and outflows are always related to the respective number n of lanes, i.e., divided by n.

The high level of significance particularly of the phase transition from free traffic flow to synchronized traffic flow in terms of ensuring the maximum possible efficiency of the road and in terms of predicting traffic is due particularly to the fact that in synchronized traffic flow the throughput rate of vehicles can be virtually the same as for free traffic flow despite the very greatly increased trip time. The detection of the phase transition to synchronized traffic flow, and the dispersal of such traffic state and a return to the state of free traffic flow makes it possible to take suitable countermeasures in good time when synchronized traffic flow occurs. These phase transitions can be determined as an anticipated phase transition, both for the current time and, when necessary, also as part of a prediction relating to the future traffic states.

In the method according to one embodiment of the invention, in order to detect a phase transition to synchronized traffic flow, the average velocity and the traffic flow are tested to i) determine whether the average velocity decreases to a greater extent than a predefined amount, and ii) whether the traffic flow is more than a predefinable flow threshold value. The former condition makes use of the observation that at the transition from free traffic flow to synchronized traffic flow the average velocity decreases comparatively quickly. With the second condition, the state of synchronized traffic flow is distinguished from the wide moving traffic jams state since in the latter the traffic flow is significantly lower than in the case of synchronized traffic flow.

According to another embodiment of the invention, in order to detect a phase transition to synchronized traffic flow specific interrogations are made regarding the conditions as to whether: i) the average velocity is decreasing ii) the traffic flow is more than a predefinable flow threshold value, and iii) the quotient formed from the change in the average velocity divided by the change in the traffic flow exceeds a predefinable threshold value in absolute terms. The first condition makes use of the observation that at the transition from free traffic flow to synchronized traffic flow, the average velocity decreases comparatively quickly and significantly, whereas the traffic flow does not exhibit such a severe change.

According to another feature of the invention, future phase transitions from free traffic flow to synchronized traffic flow are estimated in advance as part of a traffic prediction; that is, an advance calculation of the expected traffic states in the road traffic system (and/or specific sections thereof). Such phase transitions are caused by upstream phase transitions which are detected at the given moment. This detection in advance of future states of synchronized traffic flow can be advantageously used to improve the estimation of anticipated trip times and to initiate, at an early point, suitable countermeasures with which an expected slowdown of the traffic (or even wide moving traffic jams) can be counteracted by means of appropriate traffic control measures. The criterion which is used for the prediction also takes into account the case in which entries and/or exits are located between the point of the currently detected traffic states and the point of the predicted upstream synchronized traffic flow state.

In a monitoring method developed according to another embodiment of the invention, the duration of a synchronized traffic flow state which has been caused by a currently detected phase transition from free traffic flow to synchronized traffic flow upstream of an entry or exit is estimated in advance by means of specified criteria. Entry is to be understood in this case in the broader sense, to include a constriction at which the number of lanes is reduced. In an analogous way, in another embodiment the spatial extent of such an induced, synchronized traffic flow state is predicted on the basis of specified criteria.

In still another embodiment of the method according to the invention, a phase transition from synchronized traffic flow to free traffic flow is deduced if the average velocity exceeds a predefinable velocity threshold value or rises above a predefinable velocity value by more than a predefinable degree. The state of synchronized traffic flow is not dispersed, and thus a transition to free traffic flow is not achieved until, due to an appropriate hysteresis phenomenon, there are significantly lower traffic densities than the inverse situation, when synchronized traffic flow is formed from previously free traffic flow. It therefore becomes apparent that the inventive observation of the average velocity to determine whether it exceeds a certain threshold value or rises above a predefinable velocity value by more than a predefinable degree constitutes a very reliable criterion as to whether the state of synchronized traffic flow has been dispersed and has changed into free traffic flow.

The monitoring method according to yet another embodiment of the invention, constitutes an improvement of the method described in German patent document DE 196 47 127 A1 (referred to previously) and permits a comparatively reliable estimation in advance of the development of a predicted wide moving traffic jam state which is occurring at a given moment, has been detected or will occur in future. This prediction of the development of wide moving traffic jams states can then be taken into account, for example, in a trip time prediction. It is apparent that with this method the start of the wide moving traffic jams state and the end of the wide moving traffic jams state, and consequently all the aspects of the development of the wide moving traffic jams can be forecast comparatively reliably.

According to another feature of the invention, it is possible to estimate in advance the velocity values of the upstream and/or downstream front wide moving traffic jams from previously available traffic state data for a future period if no more recently updated traffic state data can be acquired in this period. The future positions of the upstream and/or downstream front wide moving traffic jams can then also correspondingly be determined.

An inflow control method according to the invention makes use of the observation of phase transitions between free traffic flow and synchronized traffic flow by means of traffic state monitoring as described above, in order to appropriately control the vehicle inflow at a respective inflow point, as a function of these phase transitions. This use of detected phase transitions from free traffic flow to synchronized traffic flow as a basis of an inflow control system helps to optimize the traffic flow in the road system, without the need of frequent control interventions into the traffic flow. This low frequency of control interventions into the traffic inflow advantageously also ensures that their effects on the secondary traffic system sections from which the inflow takes place is kept low. Overall, in this way the inflow control method according to the invention under the given conditions of a continuously growing traffic volume ensures optimum efficiency of the traffic system, in particular on expressway sections thereof.

In another embodiment of the inflow control method herein, inflow is restricted if a phase transition from free traffic flow to synchronized traffic flow is detected at a monitoring point which is nearest in the downstream and/or upstream direction to the inflow point.

Finally, in another embodiment of the invention, the inflow restriction which is activated beforehand at the transition to synchronized traffic flow is lifted again if a phase transition to free traffic flow is detected at the nearest upstream and/or downstream monitoring point; that is, the previously detected synchronized traffic flow has dispersed again to form free traffic flow.

Other objects, advantages and novel features of the present invention will become apparent from the following detailed description of the invention when considered in conjunction with the accompanying drawings.

DETAILED DESCRIPTION OF THE DRAWINGS

The method according to the invention, which is explained below with reference to a roadway section represented by way of example, serves to minimize trip times in the respective traffic system (in particular an expressway system) and to achieve the highest possible degree of efficiency of these roads. For this purpose, the method includes a traffic state monitoring system with detection of phase transitions between free traffic flow and synchronized traffic flow and an entry metering system at entries, i.e., entrance ramps, of in particular multi-lane expressways, which is dependent on the traffic state which has been detected as such and which is thus dependent on the detection of the phase transitions between free traffic flow and synchronized traffic flow. With this traffic-state-dependent inflow control system it is possible to achieve maximum road use efficiency as well as the shortest possible trip times, with relatively few interventions in the flowing traffic in the form of inflow restrictions.

This is because, in the present case, an inflow restriction need not take place until the monitored traffic state changes from free traffic flow to synchronized traffic flow. Further details will now be explained with reference to the traffic system section shown.

Figure 1:
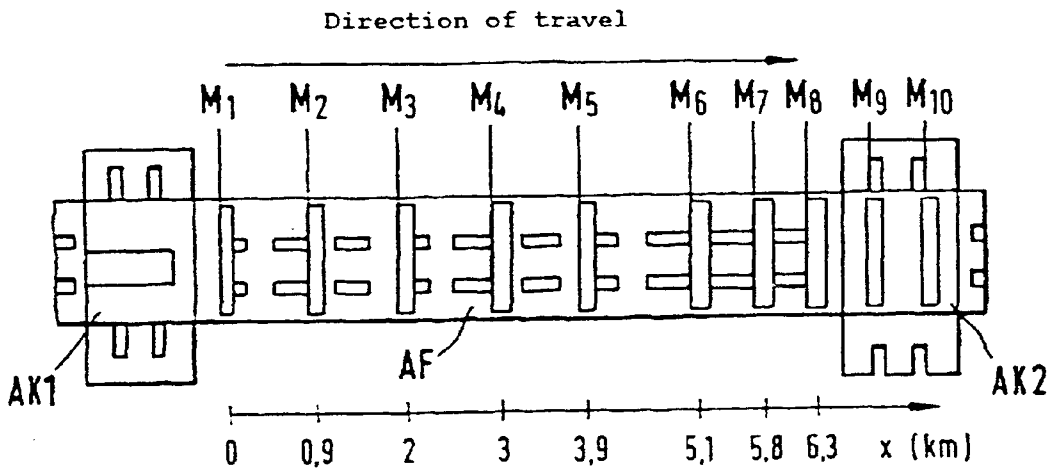
FIG. 1 shows a schematic block diagram of a three-lane roadway section with a plurality of monitoring points, spaced apart from one another, for monitoring traffic states.

FIG. 1 shows by way of example a three-lane roadway section AF between an upstream roadway intersection AK1 and a downstream roadway intersection AK2. Ten measurement points $M_1$ to $M_{10}$ in the form of respective induction coil detectors with measuring point intervals between 500 m and 1200 m are provided over the roadway section AF. The measurement points $M_1$ to $M_{10}$ supply minute-by-minute traffic measured data in the form of the average vehicle velocity and the traffic flow on an individual basis for each of the three lanes to a conventional traffic control center (not shown) which is equipped with a control computer for monitoring and controlling traffic. Depending on requirements, each lane can be evaluated individually or velocity and traffic flow values, i.e., traffic density, which are averaged over all the lanes are used. Alternatively, other conventional techniques for sensing and evaluating the data which are relevant to the traffic state can also be used, for example from traffic measurements using infrared detectors or video cameras, from sample vehicle data (so-called floating car data), or from measurements of the degree of occupancy or of the spacing between vehicles. Furthermore, the data can also be acquired from a load curve prediction.

Figure 2:
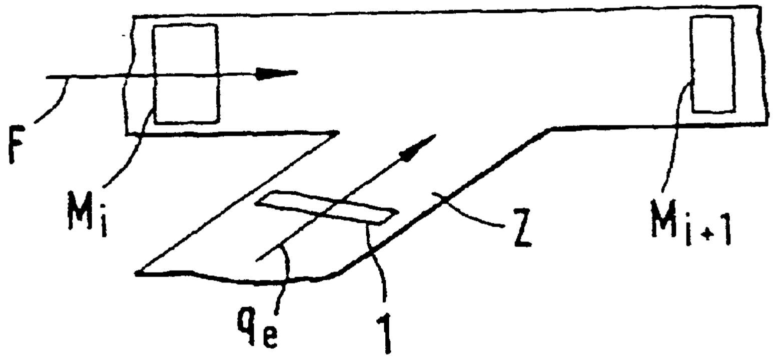
FIG. 2 shows a schematic plan view of part of the roadway section in FIG. 1 with an entry.

FIG. 2 shows by way of example a region of the roadway section from FIG. 1, which contains an entry Z and in which the measurement point or monitoring point $M_{i+1}$ which is nearest in the downstream direction to this entry Z and the measurement point or monitoring point $M_i$ in the upstream direction to it are represented schematically. A suitable inflow control system 1 (for example, a controllable barrier or optical signal system), with which the inflow $q_e$ of vehicles entering the roadway section via the entry Z can be controlled as a function of the traffic state, is provided at the entry Z. To this end, the inflow control system has a data exchange connection to the traffic control center. Specifically for this inflow control there is provision for the inflow $q_e$ to be restricted, i.e. sufficiently reduced, if a phase transition from free traffic flow to synchronized traffic flow is detected in the adjacent roadway section, whether as a current state or as a traffic state which is expected in future owing to a traffic prediction. As soon as the dispersal of the synchronized traffic flow (i.e., a phase transition to free traffic flow) is then detected again at a later time, the inflow restriction is eliminated again.

In order to bring about this traffic-state-dependent inflow control, the state monitoring method includes the following measures. The average velocity and traffic density values and their changes over time are determined or predicted and evaluated for the lanes individually or as a whole using any desired conventional detection method, for all the measurement points or general monitoring points which represent the "reference points" for evaluating the traffic state measured data and, if appropriate, for predicting future traffic states by means of the traffic control computer. This evaluation includes both implementing further conventional measures and detecting whether a phase transition between free traffic flow and synchronized traffic flow takes place at the respective monitoring point. Depending on the system configuration, various traffic state predictions can also be carried out, for example a prediction of the state of the traffic after a phase transition has been detected, a prediction of phase transitions induced by a phase transition detected upstream of the same, a prediction of the occurrence of wide moving traffic jams and/or a prediction of how synchronized traffic flow, will change by means of updated measurements in the main direction of travel, by means of a forecast of the result of the inflow control and/or by means of a load curve prediction of the inflow. Load curve prediction is to be understood here as a prediction which is based on empirical data relating to the traffic state which is likely at the respective location at the respective time. If an occurrence of wide moving traffic jams has been detected by any prediction or appropriate measurements of the queuing state of the traffic, a prediction of how the state will change in future and/or a corresponding trip time prediction can be carried out, for example by means of the method described in German patent document DE 196 47 127 A1 cited above, or a method which in contrast is modified as follows.

In the latter method, the positions $x_1$ and/or $x_r$ of the upstream or downstream edge of the wide moving traffic jams which is detected at a particular time by measuring means or by prediction, or are anticipated at a future time, are estimated in advance according to the following relationships:

$$x_l(t) = -\int_{t_0}^{t} \frac{q_0(t) - q_{\min}}{\rho_{\max} - \rho_0(t)}\, dt, \quad t \geq t_0$$

$$x_r(t) = -\int_{t_1}^{t} \frac{q_{out}(t) - q_{\min}}{\rho_{\max} - \rho_{\min}(t)}\, dt, \quad t \geq t_1$$

where $\rho_{min}$ designates the downstream traffic density behind the wide moving traffic jams, determined by any desired method or by reference to the relationship $\rho_{min}=q_{out}(t)/w_{max}(t)$, and $\rho_0$ is the upstream traffic density in front of the wide moving traffic jams which can also be determined by means of any desired conventional method or calculated by means of the relationship $\rho_0=q_0(t)/w_0(t)$ Furthermore $q_{out}$ and $w_{max}$ signify the flow or the average vehicle velocity of the traffic at the respective downstream monitoring point behind the wide moving traffic jams and $q_0$ and $w_0$ signify the flow and the average vehicle velocity of the traffic at the corresponding upstream monitoring point in front of the wide moving traffic jams. The time $t_o$ is when the upstream edge of wide moving traffic jams is detected or predicted at a particular location by any measuring or prediction method, while $t_1$ designates the time at which the downstream edge of the wide moving traffic jams is detected or predicted at a location by means of any desired measuring method or prediction method. In a measurement of the degree of occupancy, as is customary in the USA, for example, the traffic density values $\rho_{min}$, $\rho_{max}$ and $\rho_0$ are to be replaced in the specified relationships by the corresponding values $B_{min}$, $B_{max}$ and $B_0$ for the degrees of occupancy which are scaled with a factor $\lambda$. Preferably, in order to predict the changing states of the wide moving traffic jams and propagation of the wide moving traffic jams, all the values of the integrand, i.e. $q_{min}$, $q_{out}$, $q_0$, $\rho_{max}$, $\rho_{min}$ and $\rho_0$ are determined by any desired conventional load curve prediction. Moreover, the procedure is effected in accordance with a known method such as that disclosed for example, in the German patent document DE 196 47 127 A1.

Within the scope of this prediction of change in the wide moving traffic jams, may no longer be possible to use certain measurement point values or monitoring point values starting from a time $t^{(k)}$ upstream of the wide moving traffic jams and/or starting from a time $t^{(m)}$ downstream of the wide moving traffic jams. (That is, the traffic state parameters upstream and downstream of the wide moving traffic jams can be measured or determined by a load curve prediction only up to the time $t^{(k)}$ or $t^{(m)}$). In this case, according to the invention the rest of the prediction average velocity values $v_{gr}$, $v_{gl}$ are derived for the downstream or upstream edge of the wide moving traffic jams from the traffic state data detected up to that point, in accordance with the following relationships:

$$v_{gr} = -\frac{1}{k}\sum_{t=t_0}^{t^{(k)}} \frac{q_{out}(t) - q_{\min}}{\rho_{\max} - \rho_{\min}(t)}, \quad \text{with } k = \frac{t^{(k)} - t_0}{\Delta t},$$

$$v_{gl} = -\frac{1}{m}\sum_{t=t_1}^{t^{(m)}} \frac{q_o(t) - q_{\min}}{\rho_{\max} - \rho_0(t)}, \quad \text{with } m = \frac{t^{(m)} - t_1}{\Delta t},$$

where $\Delta t$ signifies the cycle time of the prediction method and a parameter thereof which is to be validated. The associated spatial coordinates $x_r$, $x_1$, of the edges of the wide moving traffic jams can then be predetermined for the downstream and upstream edge of the wide moving traffic jams from the average velocities $v_{gr}$, $v_{gl}$ estimated in this way in advance in accordance with the following relationships:

$$x_r(t)=x_r(t^{(k)})-|V_{gr}|(t-t^{(k)}), \text{ with } t \geqq t^{(k)}$$

$$x_1(t)=x_1(t^{(m)})-|V_{gl}|(t-t^{(m)}), \text{ with } t \geqq t^{(m)}$$

Analogously, the velocity $v_{gr}$ of the downstream edge of the wide moving traffic jams can also be determined and used as a characteristic anticipated value of any desired road. The velocity values $v_{gr}$, $v_{gl}$ of the downstream or upstream edge of the wide moving traffic jams can also be determined directly using a load curve method.

It is possible to detect reliably a phase transition from free traffic flow to synchronized traffic flow with the following procedure. For a particular monitoring point, the differences $dv_{t1,t2}$ of the average velocity values $v_{t1}$, $v_{t2}$ of two chronologically successive measurement cycles which are carried out at the times t1 and t2=t1+$\Delta$t are determined, $\Delta$t being any desired selectable time interval greater than zero, representing a parameter of the method which is to be validated. Subsequently, it is detected whether the respective velocity differences $dv_{t1,t2}=v_{t2}-v_{t1}$ on one hand are less than zero and on the other hand greater than a predefinable velocity threshold value $v_G$ in absolute terms; that is, whether the conditions $dv_{t1,t2}<0$ and $|dv_{t1,t2}|>v_G$ are fulfilled. Furthermore, the traffic flow $q_{t2}$ at the respective time t2 is determined and it is detected whether it exceeds a predefinable flow limit value $q_G$ (that is, whether the condition $q_{t2}>q_G$ is fulfilled). If all three abovementioned conditions are fulfilled, this is interpreted as the occurrence of a phase transition from free traffic flow to synchronized traffic flow.

It is apparent that the method for this determination is very reliable. The two velocity conditions allow for the fact that at this actual phase transition there is a comparatively rapid decline in the average velocity. The traffic flow condition reliably distinguishes, on the one hand, between synchronized traffic flow and wide moving traffic jams state and, on the other hand, between states of free traffic flow with relatively little traffic flow.

In an alternative procedure for detecting the occurrence of a phase transition from free traffic flow to synchronized traffic flow the average velocities $v_{t1}$, $v_{t2}$ of two chronologically successive measurement cycles are, as in the above method, registered and checked to determine whether their differences $dv_{t1,t2}=v_{t2}-v_{t1}$ are less than zero. Likewise, the traffic flow $q_{t2}$ at the time t2 is registered and checked to determine whether it is greater than a predefined flow threshold value $q_G$. Furthermore, in contrast to the above method, the difference $dq_{t1,t2}=q_{t2}-q_{t1}$ between the traffic density values $q_{t1}$, $q_{t2}$ and the two chronologically successive measurement cycle times t1, t2 and subsequently the quotient $dv_{t1,t2}/dq_{t1,t2}$ of the difference $dv_{t1,t2}$ between the average velocities divided by the difference $dq_{t1,t2}$ between the associated traffic flows are formed. It is then tested whether this quotient $dv_{t1,t2}/dq_{t1,t2}$ exceeds in absolute terms a predefinable threshold value. This condition on the quotients which are formed takes the place of the velocity threshold value condition of the method previously specified above. If all three conditions are fulfilled, this in turn is interpreted as the occurrence of a phase transition from free traffic flow to synchronized traffic flow.

It is apparent that the quotient condition is also very suitable for this purpose. This takes into account the fact that the average velocity changes more (decreases), at the transition from free traffic flow to synchronized traffic flow than the traffic flow which is known to correspond to the product formed from the traffic density and the average velocity. The decrease in the average velocity is at least partially compensated at the transition from free traffic flow to synchronized traffic flow by the increasing traffic density which actually causes the occurrence of synchronized traffic flow.

If the occurrence of a phase transition from free traffic flow to synchronized traffic flow is detected at a specific monitoring point at a certain time in one of the above methods, there is preferably also provision for a prediction to be carried out as to whether such phase transition causes, upstream of it, a corresponding phase transition at a later time. This is assumed if at the particular time at which the phase transition was detected at the particular monitoring point a smaller traffic flow is detected than at a point lying upstream thereof. This is because in this case, the inflow of vehicles into the location of the forming synchronized traffic flow is greater than the outflow of vehicles, so that the zone comprising synchronized traffic flow propagates in the upstream direction.

The above criterion applies, strictly speaking, to the case in which there are no entries or exits between the two respective points. However, this case can be taken into account by a simple modification of this criterion, in which modification the traffic flow at the location of the current phase transition is reduced by possible inflows at entries or increased by possible outflows at exits. The criterion is therefore that the traffic flow at the location of the current phase transition is less than the sum of the traffic flow at the upstream point plus the difference between any inflows and outflows between the two points.

In a similar way, when necessary, a prediction relating to the duration and/or spatial extent of a synchronized traffic flow state can be made after the detection of a corresponding phase transition from free traffic flow to synchronized traffic flow upstream of an entry or exit if the abovementioned conditions for an induced upstream phase transition from free traffic flow to synchronized traffic flow apply. (The term entry also includes constrictions at which the number of lanes is reduced.) For predicting the duration of this ongoing, synchronized traffic flow, it is assumed that the latter lasts for as long as the traffic flow on the entry exceeds a specific predefinable value, or as long as the velocity of the vehicles in the exit is less than a specific, predefinable value; and moreover, as a second condition, the traffic flow upstream on the main carriageway exceeds a specific predefinable value.

To predict the spatial extent of the synchronized traffic flow state upstream of an entry or exit, it is assumed that the downstream limit of the ongoing synchronized traffic flow state remains at the particular entry or exit, or is situated at the location at which a phase transition from synchronized traffic flow to free traffic flow is detected, and that its upstream limit arises from the fact that either i) the abovementioned conditions for an induced upstream phase transition from free traffic flow to synchronized traffic flow are no longer fulfilled there or ii) wide moving traffic jam arises over an extensive area, so that its further changes in state can then be tracked with the aforementioned prediction of how the wide moving traffic jams will change. The downstream limit of wide moving traffic jams determines, in this case, the upstream limit of the synchronized traffic flow state which is estimated in advance.

The dispersal of synchronized traffic flow and thus the transition to free traffic flow, does not take place as easily as the formation of synchronized traffic flow from free traffic flow as the traffic volume increases. Experience has shown that in the end phase of a dispersal process from synchronized traffic flow, (i.e., at the phase transition to free traffic flow), the average velocity rises to significantly higher values than previously. In order to detect phase transitions from synchronized traffic flow to free traffic flow, in practice, it is therefore sufficient to use the criterion that the average velocity exceeds a predefinable, further velocity threshold value. Alternatively, the criterion as to whether the change in the average velocity over time exceeds an associated threshold value and the average velocity itself lies above a threshold value which is predefined in association with it can also be used.

The above explained detection of phase transitions between free traffic flow and synchronized traffic flow is then used in a vehicle inflow control method to control the vehicle inflow as a function of the occurrence of these phase transitions. The various possibilities of this inflow control are described below with reference to the example in FIG. 2. In a first variant, the monitoring point $M_{i+1}$ which is nearest to the respective inflow point Z in the downstream direction is monitored for the occurrence of such phase transitions. As long as the traffic control computer detects free traffic flow here, it keeps the inflow control means 1 of the entry Z inactive, so that vehicles can enter from there without restriction. As soon as the control computer detects the occurrence of a phase transition from free traffic flow to synchronized traffic flow at the downstream monitoring point $M_{i+1}$, it activates the inflow control means 1 and thus restricts the vehicle inflow $q_e$ via the entry Z to a predefinable degree which can preferably be predefined in a variable fashion as a function of the situation, i.e., as a function of the number of lanes on the main route and/or of measured or predicted values for the traffic flow on the main route upstream of the synchronized traffic flow which occurs. In a simplified embodiment, it may also be provided for the entry Z to be completely closed at the times of synchronized traffic flow If the control computer then detects using the average velocity values at the respective monitoring point $M_{i+1}$ that an inverted phase transition from synchronized traffic flow to free traffic flow has taken place there, i.e., that the synchronized traffic flow has dispersed to free traffic flow, it lifts the entry restriction by appropriately activating the inflow control means 1.

A second embodiment uses a procedure which is analogous to the first (above), and which differs from the latter only in that, instead of the monitoring point $M_{i+1}$ which is nearest in the downstream direction to the entry Z, the monitoring point $M_i$ which is nearest in the upstream direction is used. That is, the traffic control computer detects the occurrence of phase transitions from free traffic flow to synchronized traffic flow, and vice versa, at this upstream point $M_i$. If free traffic flow occurs there, there is no restriction of the inflow via the entry Z, whereas given a transition to synchronized traffic flow the inflow control means 1 restrict this inflow $q_e$ as a function of the situation.

In two further embodiments, the occurrence of phase transitions between free traffic flow and synchronized traffic flow is monitored both at the nearest monitoring point $M_i$ to the respective entry Z in the upstream direction and at the nearest monitoring point $M_{i+1}$ to the respective entry Z in the downstream direction. A restriction of the inflow $q_e$ via the entry Z is then imposed in one of these two embodiments at the time at which the occurrence of a phase transition from free traffic flow to synchronized traffic flow is detected at the monitoring point $M_i$ which is nearest in the upstream direction to the entry Z. The inflow restriction is subsequently lifted again at the time when the reverse phase transition from synchronized traffic flow to free traffic flow is detected at the monitoring point $M_{i+1}$ nearest in the downstream direction to the entry Z, in that, for example, the average velocity exceeds a predefinable threshold value. In the other embodiment which makes use of both monitoring points $M_i$, $M_{i+1}$, their roles are interchanged. That is, an entry restriction is imposed if a phase transition from free traffic flow to synchronized traffic flow is detected at the monitoring point $M_{i+1}$ which is nearest in the downstream direction, and the entry restriction is lifted again if a reverse phase transition from synchronized traffic flow to free traffic flow has been registered at the monitoring point $M_i$ which is nearest in the upstream direction.

The application of the method, explained above in advantageous embodiments, for inflow control as a function of the occurrence of phase transitions between free traffic flow and synchronized traffic flow permits a high degree of efficiency of appropriately monitored and inflow-controlled roads, reduced trip times and reliable traffic predictions. Even when there is a large traffic volume, the state of free traffic flow is maintained for as long as possible and optionally a forecast relating to the way in which the synchronized traffic flow will change and/or wide moving traffic jams will occur is made. The method according to the invention minimizes the duration of the states of synchronized traffic flow by means of inflow-restricting control intervention.

Of course, embodiments of the invention other than those described above are possible. In particular it is clear that the threshold values and phase transition criteria which are mentioned can be determined by the person skilled in the art in accordance with the particular application and varied, when necessary, as a function of the situation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring traffic in a road traffic system, in which a distinction is made between three types of traffic states, including free traffic flow, synchronized traffic flow and wide moving traffic jams, said method comprising:

determining one of current traffic states and predicted traffic states for at least one point of the traffic system; and determining that a phase transition from free traffic flow to synchronized traffic flow occurs at said at least one point if the following conditions are fulfilled (i) average traffic velocity decreases by more than a predefinable degree, and (ii) traffic flow exceeds a predefinable flow threshold value.

2. The method according to claim 1, wherein:

when a current phase transition from free traffic flow to synchronized traffic flow is detected, traffic flow at the location of the current phase transition and traffic flow upstream of it are sensed and compared with one another; and the occurrence of an induced future phase transition from free traffic flow to synchronized traffic flow at an upstream point is deduced if the traffic flow at the location of the current phase transition is less than the sum of the traffic flow at the upstream point plus a difference of any inflows and outflows between the upstream point and the location of the current phase transition.

3. The method according to claim 1, wherein:

when a current phase transition from free traffic flow to synchronized traffic flow is detected upstream of an entry or exit, the duration of an upstream synchronized traffic flow state induced thereby is predicted by assuming that it will persist until, first, the traffic flow at the entry exceeds a predefinable threshold value or the average vehicle velocity in the exit is lower than a predefinable threshold value, and second the traffic flow upstream in the road traffic system exceeds a predefinable threshold value.

4. The method according to claim 1, wherein:

when a current phase transition from free traffic flow to synchronized traffic flow is detected upstream of an entry or exit, spatial extent of an upstream synchronized traffic flow state induced thereby is predicted, on the one hand, by assuming that a downstream edge of the synchronized traffic flow state remains at the entry or exit or is situated at the location at which a phase transition from synchronized traffic flow to free traffic flow traffic is detected, and on the other hand, the position of the upstream edge of the synchronized traffic flow state is deduced from the fact that either the conditions for an induced phase transition from free traffic flow to synchronized traffic flow are no longer fulfilled or the occurrence of wide moving traffic jams is detected.

5. The method for monitoring traffic states in a road traffic system according to claim 1, wherein:

current traffic states or predicted likely traffic states are determined for at least one point of the traffic system; and a phase transition from synchronized traffic flow to free traffic flow is deduced if average traffic velocity exceeds a predefinable velocity threshold value or rises above a predefinable velocity threshold value by more than a predefinable degree.

6. The method for monitoring traffic states in a road system, in particular according to claim 1, wherein:

after wide moving traffic jams has been detected, change therein is predicted by continuously estimating time-dependent positions of at least one of the upstream edge of the wide moving traffic jams and the downstream edge of the wide moving traffic jams respectively, in accordance with the relationships $$x_l(t) = -\int_{t_0}^{t} \frac{q_0(t) - q_{\min}}{\rho_{\max} - \rho_0(t)} dt, \quad t \ge t_0$$

$$x_r(t) = -\int_{t_1}^{t} \frac{q_{out}(t) - q_{\min}}{\rho_{\max} - \rho_{\min}(t)} dt, \quad t \ge t_1$$

where (i) $q_{min}$ is traffic flow in the wide moving traffic jams and $\rho_{max}$ is the traffic density in the wide moving traffic jams, (ii) $t_0$ is a time at which the upstream edge of wide moving traffic jams at a location is detected or predicted, (iii) $t_1$ is a time at which the downstream edge of wide moving traffic jams at a location is detected or predicted, (iv) $q_{out}$ and $\rho_{min}$ are flow or traffic density downstream of the wide moving traffic jams and (v) $q_0$ and $r_0$ are flow or traffic density upstream of the wide moving traffic jams.

7. The method according to claim 6, wherein:

velocities for at least one of the downstream and upstream edges of the wide moving traffic jams are estimated in advance, starting from a time $t^{(k)}$ or $t^{(m)}$ in accordance with the following relationships:

$$v_{gr} = -\frac{1}{k}\sum_{t=t_0}^{t^{(k)}} \frac{q_{out}(t) - q_{\min}}{\rho_{\max} - \rho_{\min}(t)}, \quad \text{with } k = \frac{t^{(k)} - t_0}{\Delta t},$$

$$v_{gl} = -\frac{1}{m}\sum_{t=t_1}^{t^{(m)}} \frac{q_o(t) - q_{\min}}{\rho_{\max} - \rho_0(t)}, \quad \text{with } m = \frac{t^{(m)} - t_1}{\Delta t},$$

from recorded traffic state data, $\Delta t$ being a prediction cycle time which is to be validated and k or m being the number of executed monitoring cycles which have been taken into account.

8. A method for monitoring traffic in a road traffic system, in which a distinction is made between three types of traffic states, including free traffic flow, synchronized traffic flow and wide moving traffic jams, said method comprising:

determining one of current traffic states and predicted traffic states for at least one point of the traffic system; and determining that a phase transition from free traffic flow to synchronized traffic flow occurs if the following conditions are fulfilled (i) average traffic velocity decreases, (ii) traffic flow exceeds a predefinable flow threshold value, and (iii) the absolute value of the quotient formed from the change in the average velocity divided by the change in the traffic flow exceeds a predefinable threshold value.

9. The method according to claim 8, wherein:

when a current phase transition from free traffic flow to synchronized traffic flow is detected, traffic flow at the location of the current phase transition and traffic flow upstream of it are sensed and compared with one another; and the occurrence of an induced future phase transition from free traffic flow to synchronized traffic flow at an upstream point is deduced if the traffic flow at the location of the current phase transition is less than the sum of the traffic flow at the upstream point plus a difference of any inflows and outflows between the upstream point and the location of the current phase transition.

10. The method according to claim 8, wherein:

when a current phase transition from free traffic flow to synchronized traffic flow is detected upstream of an entry or exit, the duration of an upstream synchronized traffic flow state induced thereby is predicted by assuming that it will persist until, first, the traffic flow at the entry exceeds a predefinable threshold value or the average vehicle velocity in the exit is lower than a predefinable threshold value, and second the traffic flow upstream in the road traffic system exceeds a predefinable threshold value.

11. The method according to claim 8, wherein:

when a current phase transition from free traffic flow to synchronized traffic flow is detected upstream of an entry or exit, spatial extent of an upstream synchronized traffic flow state induced thereby is predicted, on the one hand, by assuming that a downstream edge of the synchronized traffic flow state remains at the entry or exit or is situated at the location at which a phase transition from synchronized traffic flow to free traffic flow is detected, and on the other hand, the position of the upstream edge of the synchronized traffic flow state is deduced from the fact that either the conditions for an induced phase transition from free traffic flow to synchronized traffic flow are no longer fulfilled or the occurrence of wide moving traffic jams is detected.

12. The method for monitoring traffic states in a road traffic system according to claim 8, wherein:

current traffic states or predicted likely traffic states are determined for at least one point of the traffic system; and a phase transition from synchronized traffic flow to free traffic flow is deduced if average traffic velocity exceeds a predefinable velocity threshold value or rises above a predefinable velocity threshold value by more than a predefinable degree.

13. The method for monitoring traffic states in a road system, in particular according to claim 8, wherein:

after wide moving traffic jams have been detected, change therein is predicted by continuously estimating time-dependent positions of at least one of the upstream edge of the wide moving traffic jams and the downstream edge of the wide moving traffic jams respectively, in accordance with the relationships $$x_l(t) = -\int_{t_0}^{t} \frac{q_0(t) - q_{\min}}{\rho_{\max} - \rho_0(t)} dt, \quad t \ge t_0$$

-continued $$x_r(t) = -\int_{t_1}^{t} \frac{q_{out}(t) - q_{\min}}{\rho_{\max} - \rho_{\min}(t)} dt, \quad t \geq t_1$$

where (i) $q_{min}$ is traffic flow in the wide moving traffic jams and $\rho_{max}$ is the traffic density in the wide moving traffic jams, (ii) $t_0$ is a time at which the upstream edge of wide moving traffic jams at a location is detected or predicted, (iii) $t_1$ is a time at which the downstream edge of wide moving traffic jams at a location is detected or predicted, (iv) $q_{out}$ and $\rho_{min}$ are flow or traffic density downstream of the wide moving traffic jams and (v) $q_0$ and $r_0$ are flow or traffic density upstream of the wide moving traffic jams.

14. The method according to claim 13, wherein:

velocities for at least one of the downstream and upstream edges of the wide moving traffic jams are estimated in advance, starting from a time $t^{(k)}$ or $t^{(m)}$ in accordance with the following relationships:

$$v_{gr} = -\frac{1}{k}\sum_{t=t_0}^{t^{(k)}} \frac{q_{out}(t) - q_{\min}}{\rho_{\max} - \rho_{\min}(t)}, \text{ with } k = \frac{t^{(k)} - t_0}{\Delta t},$$

$$v_{gl} = -\frac{1}{m}\sum_{t=t_1}^{t^{(m)}} \frac{q_o(t) - q_{\min}}{\rho_{\max} - \rho_0(t)}, \text{ with } m = \frac{t^{(m)} - t_1}{\Delta t},$$

from recorded traffic state data, $\Delta t$ being a prediction cycle time which is to be validated and k or m being the number of executed monitoring cycles which have been taken into account.

15. A method for controlling inflow in a road traffic system, with a distinction being made between three types of traffic states, including free traffic flow, synchronized traffic flow and wide moving traffic jams, said method comprising:

monitoring traffic states of a traffic system section; and controlling vehicle inflow into the traffic system section as a function of the detected traffic states;

wherein the monitoring of traffic states includes determining one of the current traffic states and predicted traffic states for at least one point of the traffic system; and determining that a phase transition from free traffic flow to synchronized traffic flow occurs at said at least one point if the following conditions are fulfilled (i) average traffic velocity decreases by more than a predefinable degree, and (ii) traffic flow exceeds than a predefinable flow threshold value; and wherein vehicle inflow at a respective inflow point is controlled as a function of the phase transitions, detected by the monitoring of traffic states, between free traffic flow and synchronized traffic flow.

16. The method according to claim 15, wherein vehicle inflow at the inflow point is restricted if a phase transition from free traffic flow to synchronized traffic flow is detected at just one monitoring point which is nearest in the downstream direction to the inflow point, at just one monitoring point which is nearest in the upstream direction to the inflow point, or at both monitoring points.

17. The method according to claim 16, wherein inflow restriction is lifted if a phase transition from synchronized traffic flow to free traffic flow is detected at only the monitoring point which is nearest in the downstream direction to the inflow point, at only the monitoring point which is nearest in the upstream direction to the inflow point, or at both monitoring points.

18. The method for controlling inflow in a road traffic system, with a distinction being made between three types of traffic states, including free traffic flow, synchronized traffic flow and wide moving traffic jams, said method comprising:

monitoring traffic states of a traffic system section, and controlling vehicle inflow into the traffic system section as a function of the detected traffic states;

wherein the monitoring of traffic states includes determining one of current traffic states and predicted traffic states for at least one point of the traffic system; and determining that a phase transition from free traffic flow to synchronized traffic flow occurs if the following conditions are fulfilled (i) average traffic velocity decreases, (ii) traffic flow exceeds a predefinable flow threshold value, and (iii) the absolute value of the quotient formed from the change in the average velocity divided by the change in the traffic flow exceeds a predefinable threshold value.

19. The method according to claim 18, wherein vehicle inflow at the inflow point is restricted if a phase transition from free traffic flow to synchronized traffic flow is detected at just one monitoring point which is nearest in the downstream direction to the inflow point, at just one monitoring point which is nearest in the upstream direction to the inflow point, or at both monitoring points.

20. The method according to claim 19, wherein inflow restriction is lifted if a phase transition from synchronized traffic flow to free traffic flow is detected at only the monitoring point which is nearest in the downstream direction to the inflow point, at only the monitoring point which is nearest in the upstream direction to the inflow point, or at both monitoring points.

* * * * *